(12) United States Patent
Tille et al.

(10) Patent No.: US 7,302,805 B2
(45) Date of Patent: Dec. 4, 2007

(54) SENSOR ARRAY USED FOR MONITORING AT LEAST TWO PHYSICAL PARAMETERS

(75) Inventors: Thomas Tille, Munich (DE); Robert Mager, Munich (DE); Robert Hoeppler, Karlskron (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 50 days.

(21) Appl. No.: 11/393,890

(22) Filed: Mar. 31, 2006

(65) Prior Publication Data

US 2006/0168977 A1  Aug. 3, 2006

Related U.S. Application Data

(63) Continuation of application No. PCT/EP2004/010705, filed on Sep. 22, 2004.

(30) Foreign Application Priority Data

Oct. 2, 2003  (DE) .............................. 103 45 835

(51) Int. Cl.
*F25B 41/00* (2006.01)
*F25B 49/00* (2006.01)
(52) U.S. Cl. .................. 62/208; 62/125; 62/228.3
(58) Field of Classification Search .................. 62/208, 62/215, 223.1, 223.3, 511, 513, 113, 244
See application file for complete search history.

(56) References Cited

U.S. PATENT DOCUMENTS

2003/0000244 A1  1/2003  Dienhart et al.

FOREIGN PATENT DOCUMENTS

DE  100 35 458 A1  2/2001
DE  101 45 669 A1  3/2003

OTHER PUBLICATIONS

International Search Report dated May 17, 2005 including PCT/ISA/237 with English Translation (Seventeen (17) pages).

*Primary Examiner*—Chen Wen Jiang
(74) *Attorney, Agent, or Firm*—Crowell & Moring LLP

(57) ABSTRACT

A sensor array, particularly for vehicle air conditioners, having a housing, in which an electronic unit, a first sensor element connected with the electronic unit for measuring a first physical parameter, and a second sensor element connected with the electronic unit for measuring a second physical parameter, are arranged. The electronic unit has an electric signal output and an analyzing module which, as a function of momentary measuring values of the physical parameters, according to a defined selection logic, determines which of the measured physical parameters is to be considered to be the momentarily relevant parameter, and which switches a sensor signal formed on the basis of the momentarily relevant parameter to the signal output.

27 Claims, 5 Drawing Sheets

SENSOR ARRAY USED FOR MONITORING AT LEAST TWO PHYSICAL PARAMETERS

CROSS-REFERENCE TO RELATED APPLICATIONS

This application is a continuation of PCT Application No. PCT/EP2004/010705 filed on Sep. 22, 2004, which claims priority to German Application No. 103 45 835.2 filed Oct. 2, 2003, the disclosures of which are incorporated by reference herein.

BACKGROUND AND SUMMARY OF THE INVENTION

The present invention relates to a sensor array, particularly for vehicle air conditioners.

Modern vehicle air conditioners, which are operated by use of the R134a refrigerant, normally have a pressure sensor on the "high-pressure side" behind the compressor, for monitoring the operating pressure and for controlling an electric fan stage. When the operating pressure exceeds a defined maximal pressure, a control will intervene, which controls the operating pressure down into a "normal pressure range", for example, by switching off the compressor.

For various reasons, carbon-dioxide-operated vehicle air conditioners will probably become significant for future vehicle generations. For controlling a "$CO_2$ refrigeration cycle", the refrigerant pressure and, in addition, the refrigerant temperature behind the compressor, are required as signal parameters. In the case of "$CO_2$ air conditioners", the refrigerant pressure and the refrigerant temperature behind the compressor are mutually independent physical parameters. For monitoring the refrigerant pressure and the refrigerant temperature, a pressure sensor and, in addition, a temperature sensor, may be provided. which are each coupled by separate electric lines or by a bus system to an electronic unit of the air conditioner. By way of the pressure sensor and the temperature sensor, the refrigerant pressure and the refrigerant temperature can be measured, can be transmitted to the electronic unit, and can be processed there. The electronic unit triggers one or more "control elements" of the refrigeration cycle.

The use of two separate sensors, which are each coupled by way of separate electric lines with the electronic control unit, and the "central processing" of two signals in the electronic unit, require high wiring and computing expenditures. It is also disadvantageous that, in the case of such arrays, the temperature sensor and the pressure sensor are each accommodated in a separate housing, and are each separately connected to the fluid cycle of the air conditioner, which may result in leakage problems.

In one aspect of the invention, a compact and cost-effective sensor array is created for monitoring at least two physical parameters, particularly for monitoring a refrigerant pressure and a refrigerant temperature in a vehicle air conditioner.

A sensor array, particularly for vehicle air conditioners, is provided, in which a first sensor element is provided for measuring a first physical parameter, and a second sensor element is provided for measuring a second physical parameter. The first physical parameter may be a refrigerant pressure, and the second physical parameter may be a refrigerant temperature. The two sensor elements are accommodated in a common housing which can be connected directly to the fluid cycle of a vehicle air conditioner. Thus, only a single "connection point" to the fluid cycle is required for the two sensor elements, which minimizes the danger of leakages. In comparison to separate sensor elements, this also reduces the weight and the number of individual components. It is also important that the sensor array is an "intelligent sensor array". In this context, "intelligent" means that the two sensor elements are connected to an electronic unit which is arranged in the, or directly on, the housing of the sensor array, which electronic unit carries out an "analysis" or "preprocessing" of the sensor signals and switches an "analyzed" signal to a signal output of the sensor array. The signal output is connected by way of an electric line or by way of a bus system with an electronic control unit of the vehicle air conditioner arranged separately from the sensor array.

An "analyzing module" is integrated in the electronic unit, or is stored there as software. As a function of measured "momentary values" of the physical parameters, according to a defined selection logic, the analyzing module determines one of the two measured physical parameters as a "momentarily relevant parameter" and switches an electric sensor output signal corresponding to the momentarily relevant physical parameter to the signal output of the sensor array. Or, on the basis of the "momentarily relevant parameter", the analyzing module forms an electric sensor output signal and switches the latter to the signal output of the sensor array.

By way of a sensor array according to the invention, two physical parameters may therefore be "monitored" simultaneously. The "electronic sensor unit", to which the two sensor elements are connected, selects, as a function of the momentary measured values and a given selection logic, the measuring signal to be momentarily considered as "relevant" or to be momentarily considered as "critical", and switches a sensor signal formed on the basis of the momentarily relevant or critical signal to the sensor signal output. In comparison to conventional systems, in which two sensors are each separately wired with the central electronic control unit of the vehicle air conditioner, the wiring expenditures are cut in half with the present invention. In addition, the data quantity to be processed in the central control unit of the vehicle air conditioner is reduced because the electronic sensor unit "on the input side" "transmits" only the momentarily relevant measuring signal to the electronic control unit of the vehicle air conditioner, or only an electric sensor signal formed on the basis of the momentarily relevant measuring signal is transmitted to the central electronic control unit.

As mentioned above, the sensor array may be a combined pressure/temperature sensor array. The housing of the combined pressure/temperature sensor array contains a pressure sensor and a temperature sensor, as well as the electronic sensor unit for analyzing the sensor signals and for "conditioning" the output signal. The electric output signal of the sensor basically represents a pressure signal which, as required, contains certain information of a temperature signal by a corresponding conversion into an "equivalent pressure signal", which will be explained in greater detail in the following.

It is explicitly pointed out that the invention is not limited to a sensor array having two sensor elements. The sensor array may also have more than two sensor elements, which each measure a physical parameter. The analyzing module would then determine the momentarily relevant parameter from the more than two physical parameters according to a corresponding selection logic and form the sensor output signal on the basis of the momentarily relevant parameter.

Advantageous embodiments and further developments of the invention are described and claimed herein.

Other objects, advantages and novel features of the present invention will become apparent from the following detailed description of the invention when considered in conjunction with the accompanying drawings.

BRIEF DESCRIPTION OF THE DRAWINGS

FIGS. 4a to 11a are views of various measuring signal courses; and

FIGS. 4b to 11b are views of sensor signal courses assigned to FIGS. 4a to 11a.

DETAILED DESCRIPTION OF THE DRAWINGS

Figure 1:
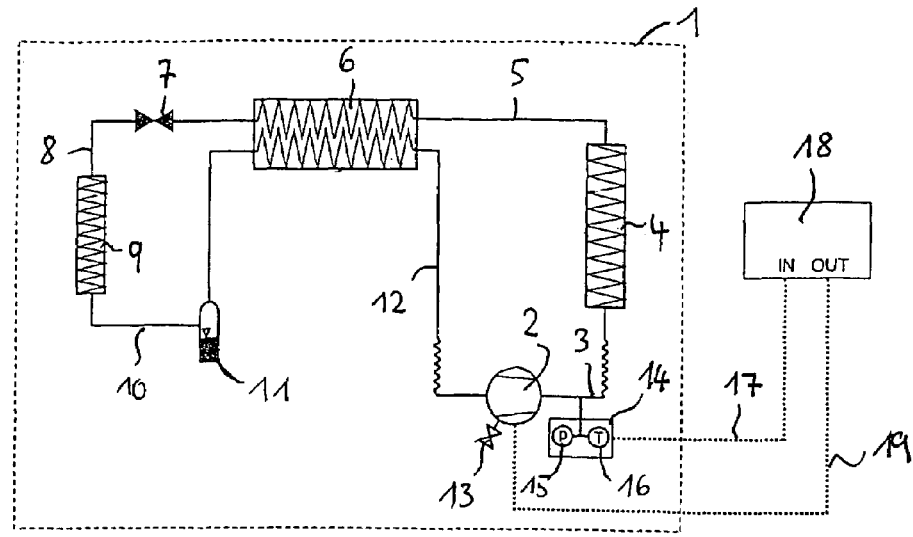
FIGS. 1 to 3 are views of various circuit arrangements of a vehicle air conditioner which is equipped with a sensor array according to the invention.

FIG. 1 illustrates a vehicle air conditioner 1 having a refrigerant compressor 2 which, on the high-pressure side, is connected by way of a fluid pipe 3 with a gas cooler 4. By way of a fluid pipe 5 and an internal heat exchanger 6, the gas cooler 4 is connected with an expansion element 7. Expanded refrigerant flows from the expansion element 7 by way of a fluid pipe 8 to an evaporator 9 and from there by way of a fluid pipe 10 to a collector 11. From the collector 11, refrigerant flows back by way of the internal heat exchanger 6 to a fluid pipe 12, which is connected with the suction side of the refrigerant compressor 2. At the refrigerant compressor 2, a pressure relief element 13 is provided by which excess pressure may be discharged.

A housing of a sensor array 14 is connected to the fluid pipe 3, which sensor array 14 has a pressure sensor 15, a temperature sensor 16 and an electronic sensor unit (not shown) to which the two sensors 15, 16 are connected. The sensor array 14 has an electric signal output which is connected with an electronic control unit 18 by way of a signal line 17. A control output 19 of the electronic control unit 18 is connected with the refrigerant compressor 2. The electronic control unit 18 controls the refrigerant compressor 2, among others, as a function of the refrigerant pressure and the refrigerant temperature in the fluid pipe 3.

Figure 2:
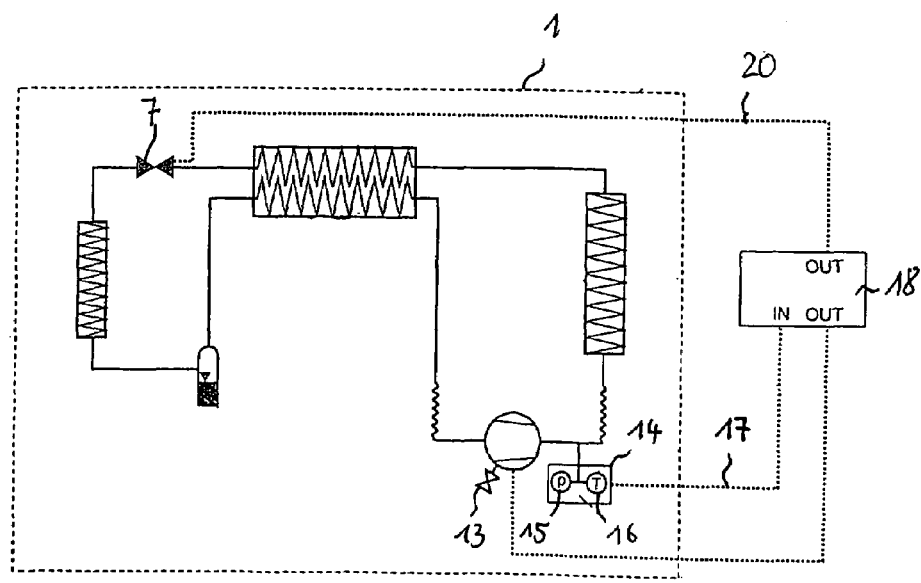

FIG. 2 shows essentially the same refrigerant cycle 1 as FIG. 1. However, in addition, in the embodiment of FIG. 2, the expansion element 7 may be electrically controlled and is connected by way of an electric line 20 with another control output of the electronic control unit 18.

Figure 3:
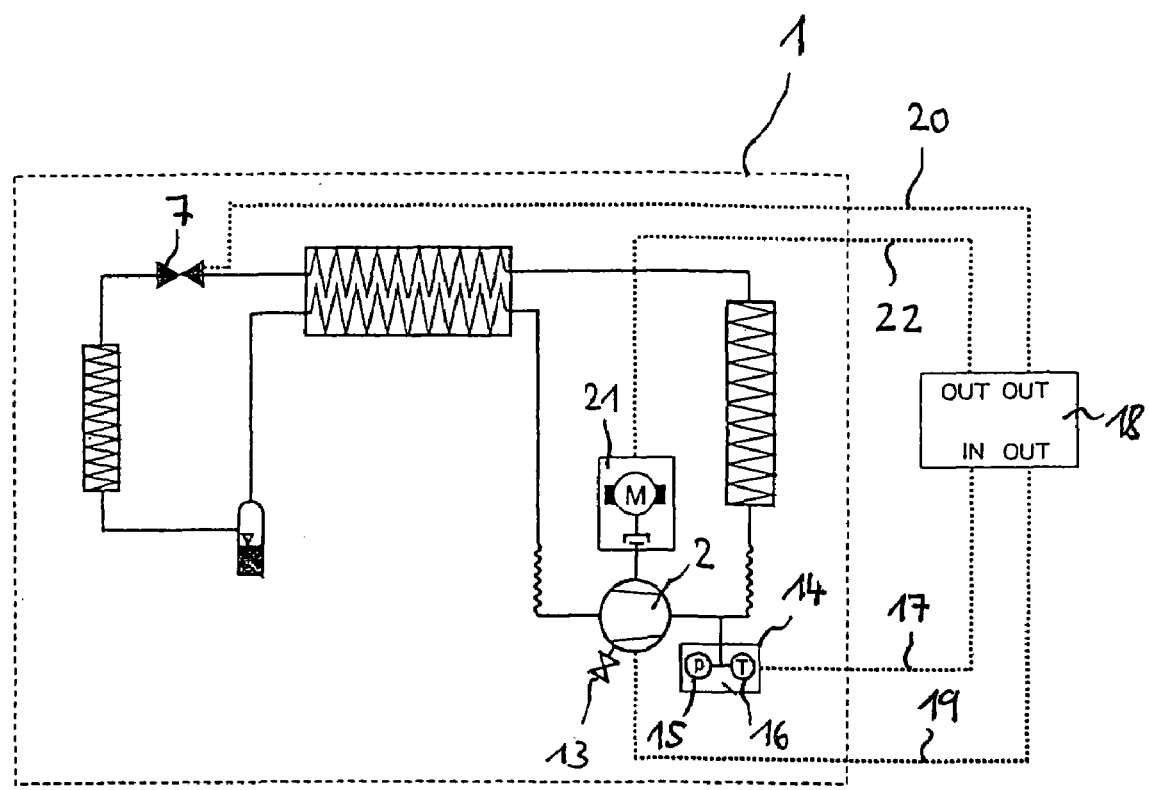

FIG. 3 shows an embodiment of the refrigeration cycle 1 in which, in addition, a magnetic clutch 21 is provided by way of which the refrigerant compressor 2 can be cut-off in the event of the occurrence of critical operating conditions. In this embodiment, the electronic control unit 18 has another control output which is connected by way of an electric control line 22 with the magnetic clutch 21 of the refrigerant compressor 2. Otherwise, the embodiment corresponds to the embodiment of FIGS. 1 and 2 respectively.

In the following, the method of operation of the refrigerant cycles 1 illustrated in FIGS. 1 to 3, particularly of the sensor arrays 14 of the refrigerant cycles 1 is explained in detail in connection with FIGS. 4a to 11a and 4b to 11b.

The diagrams of FIG. 4a to 11a show, in the manner of examples, one operating pressure course p and one temperature course θ, respectively, of the refrigerant in the fluid pipe 3 (compare FIGS. 1 to 3). FIGS. 4b to 11b each illustrate the assigned course of the electric signal present at the signal output or at the electric line 17 (compare FIGS. 1 to 3). The electric signal present at the signal output of the sensor array 14 is indicated by the symbol $p_s$ in diagrams 4b to 11b. If the measured refrigerant pressure is determined by the electronic sensor unit as the momentarily relevant operating parameter, the electric signal $p_s$ can be interpreted as a "pressure signal". If, in contrast, the measured refrigerant temperature is determined by the electronic sensor unit as the momentarily relevant operating parameter, the electric signal $p_s$ can be interpreted as a "temperature signal" or as an "equivalent pressure signal" formed on the basis of the measured refrigerant temperature, which will be explained in detail in the following.

In $CO_2$ refrigerant cycles, as they are illustrated in FIGS. 1 to 3, the permissible lasting operating pressure, that is, the operating pressure which is permitted to occur for an extended time period in the refrigerant cycle, is normally limited to a defined operating pressure $p_1$, which in the following will be called a "lower pressure limit value". The permissible lasting operating pressure $p_1$ may, for example, amount to 133 bar. An exceeding of the lower pressure limit value $p_1$ or of the permissible operating pressure $p_1$ is tolerated up to an upper limit pressure value $p_2$, to the extent that only the refrigerating capacity of the refrigerant cycle is controlled downward. The upper limit pressure value $p_2$ may, for example, amount to 140 bar. Should the operating pressure still rise further, it may be provided that, at a relief pressure of, for example, $p_3=170$ bar, the relief element 13 opens up and blows at least a portion of the refrigerant contained in the refrigerant cycle into the environment, which is considered to be an absolute emergency.

Figure 4A:
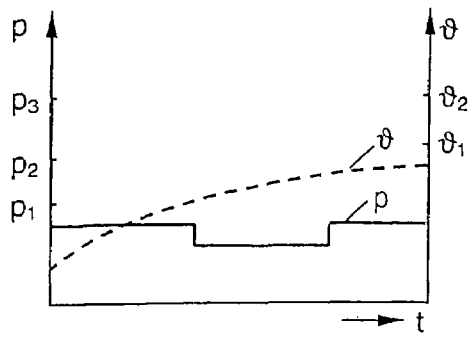
Figure 4B:
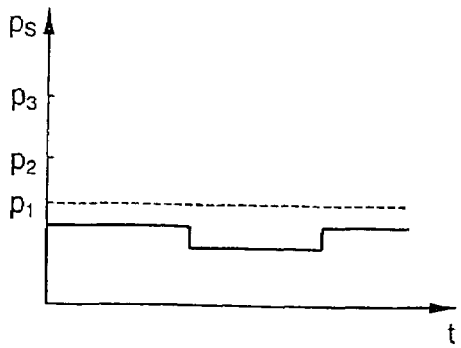

In FIG. 4a, the lower limit pressure value $p_1$, the upper limit pressure value $p_2$ and the pressure $p_3$ are indicated at which the relief element 13 (compare FIGS. 1 to 3) opens up. In addition, a first operating pressure course p is shown as an example, the operating pressure course p in FIG. 4a always being less than the lower limit pressure value $p_1$.

Furthermore, a lower temperature limit value $\theta_1$ and an upper temperature limit value $\theta_2$ are indicated. The broken line illustrates the course of the refrigerant temperature which in FIG. 4a is always less than the lower temperature limit value $\theta_1$.

Refrigerant temperatures which are less than $\theta_1$, that is, less than the lower temperature limit value, are always considered to be "noncritical". When the refrigerant temperature measured by the temperature sensor 16 (compare FIGS. 1 to 3) is less than the lower temperature limit value $\theta_1$, the sensor array 14 at the electric signal output always supplies an electric signal $p_s$ formed on the basis of the momentary pressure course p. In operating conditions in which the operating temperature is "noncritical", the sensor array 14 therefore always transmits the "pressure signal" or an electric signal $p_s$ formed on the basis of the pressure signal as a "command variable" to the electronic control unit 18.

Figure 5A:
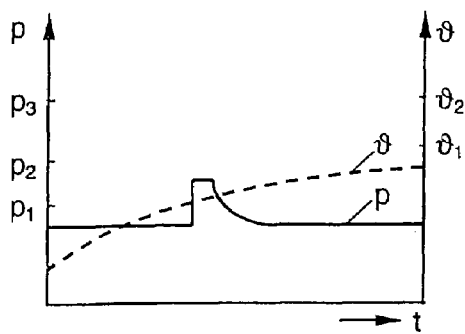
Figure 5B:
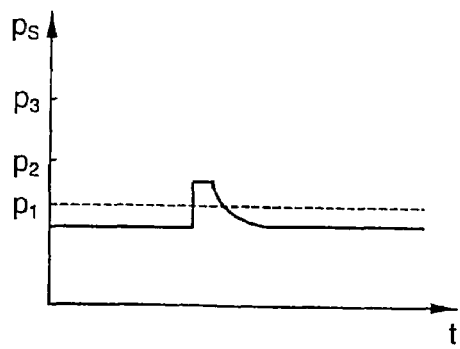

FIG. 5a shows another situation in which the measured refrigerant temperature θ is always less than the lower temperature limit value $\theta_1$ and therefore noncritical. The measured refrigerant pressure p temporarily exhibits a rise in the pressure range $p_1<p<p_2$. If, as illustrated in FIG. 5a, the operating pressure is in the range between $p_1$ and $p_2$, that is, if the lower pressure limit value $p_1$ is exceeded and the operating temperature θ is noncritical (less than the lower temperature limit value $\theta_1$), the sensor array 14, as illustrated in FIG. 5b, also emits an electric signal $p_2$ formed on the basis of the measured pressure course and feeds it to the electronic control unit 18 (FIGS. 1 to 3).

Since the lower pressure limit value $p_1$ is exceeded, the electronic control unit 18 controls or regulates the capacity of the refrigerant compressor 2 downward, so that the operating pressure p again falls below the lower pressure limit value $p_1$ and the refrigeration cycle 1 operates again in the normal pressure range $p<p_1$. As an alternative or in addition, it may be provided that, when the lower pressure limit value $p_1$ is exceeded, the electronic control unit 18 triggers an externally controllable expansion element 7, as illustrated in the embodiments of FIGS. 2 and 3, whereby the operating pressure can also be lowered.

Figure 6A:
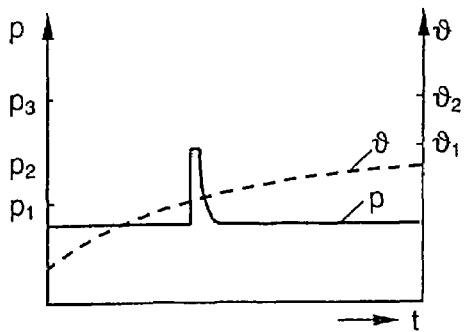
Figure 6B:
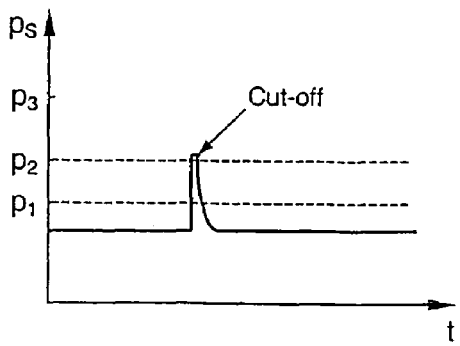

FIG. 6 shows a situation in which the refrigerant temperature θ is also again less than the lower temperature limit value $θ_1$. Here, the operating pressure p rises for a short time above the upper pressure limit value $p_2$. Here also, the operating pressure is to be considered to be a critical or relevant measuring parameter, so that, also here, the sensor array 14 supplies an electric signal $p_s$ formed on the basis of the measured operating pressure p to the electronic control unit 18. Since the upper pressure limit value $p_2$ is exceeded, the electronic control unit 18 regulates the refrigerant compressor 3 completely down which, in the following, is also called a "cut-off". The regulating down or cutting-off of the refrigerant compressor can, for example, as illustrated in FIG. 3, take place by way of a magnetic clutch 21, which is opened up in such situations and separates the drive of the refrigerant compressor 2 from the drive shaft (not shown). As a result of the cut-off of the refrigerant compressor 2, the operating pressure p in the refrigeration cycle 1 falls rapidly below the "safety threshold" $p_2$ and finally also again into the normal pressure range, that is below the lower limit pressure value $p_1$. Thus, if the upper limit pressure value $p_2$ is exceeded only slightly, an opening of the pressure relief element 13 is not necessary. "Slightly" means here that the operating pressure p is still less than the pressure $p_3$.

In the above-explained operating conditions, the refrigerant temperature was always in the normal range; that is below the lower temperature limit value $θ_1$, with the result that the operating pressure was always considered to be the relevant parameter and an electric signal $p_1$ formed on the basis of the measured operating pressure was always present at the signal output of the sensor array 14.

In the following, situations will be explained in which the refrigerant temperature rises above the "normal temperature range." In the case of $CO_2$ air conditioners, the operating temperature θ of the refrigerant behind (downstream of) the refrigerant compressor 2 and in front of (upstream of) the gas cooler 4 (compare FIG. 1) should be below the lower temperature limit value $θ_1$. The lower temperature limit value $θ_1$ may, for example, amount to 165° C. Furthermore, it may be provided that for a defined maximal time period of $t_{max}=t_2-t_1$ (compare FIG. 7a), an exceeding of the lower temperature limit value $θ_1$ is tolerated without a "temperature-caused regulating intervention" taking place. The "maximal time period" $t_{max}$ may, for example, amount to 300 seconds. However, an exceeding of the lower temperature limit value $θ_1$ whose time is limited will be tolerated only if the refrigerant temperature θ is less than the upper temperature limit value $θ_2$, which may be defined to be, for example, 180° C. Thus, if the operating temperature is in the range between $θ_1$ and $θ_2$ for a time period of less than $t_{max}$, and subsequently again drops below the temperature limit value $θ_1$, an electric signal $p_s$ formed on the basis of the measured operating pressure is transmitted to the electronic control unit 18 as in the above-explained operating conditions.

Figure 7A:
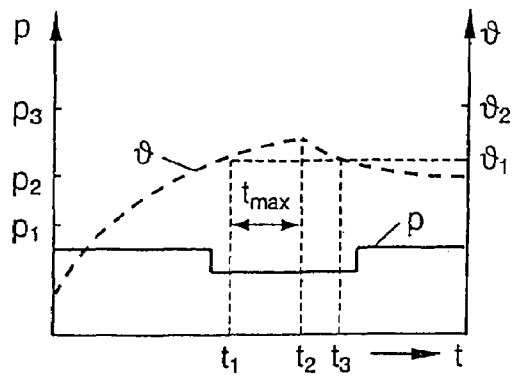

If the refrigerant temperature θ exceeds the upper temperature limit value $θ_2$ or if the refrigerant temperature θ is in a temperature range between $θ_1$ and $θ_2$ for a time duration which is longer than the defined maximal time duration $t_{max}$, if, as illustrated in FIG. 7a, the operating pressure p is in the normal pressure range (below $p_1$), starting at the point in time $t_2$, that is, after the maximal time duration $t_{max}$ has elapsed, the operating temperature of the refrigerant is considered to be the critical or relevant measuring parameter.

Figure 7B:
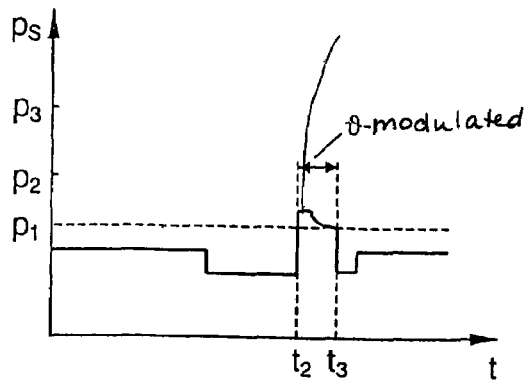

Therefore, as illustrated in FIG. 7b, starting at the point in time $t_2$, an electric signal $p_s$ formed on the basis of the refrigerant temperature θ is transmitted to the electronic control unit 18. Thus, since the refrigerant temperature exceeds the lower temperature limit value $θ_1$ for a time duration which is longer than $t_{max}$, the electronic control unit 18 regulates the refrigerant compressor 2 and/or, if present, an externally controllable expansion element 7 (compare FIGS. 2, 3) "back" in such a manner that the refrigerant temperature θ falls below the lower temperature limit value $θ_1$. At the point in time $t_3$ (FIG. 7a), the refrigerant temperature θ falls below the lower temperature limit value $θ_1$. The "analyzing module" of the sensor array 14, which may be stored as software, starting from the point in time $t_3$, again selects the pressure signal as the relevant or critical signal so that, as illustrated in FIG. 7b, starting at the point in time $t_3$, the electric signal $p_s$ present at the signal output is formed again on the basis of the measured operating pressure p.

The refrigerant temperature θ and the refrigerant pressure p in the refrigerant cycle 1 act independently of one another. As illustrated in FIG. 7a, even at a normal operating pressure, very high refrigerant temperatures may occur, for example, in the case of an "underfilling" of the system or at high load points.

As long as the temperature θ of the refrigerant is below the lower temperature limit value $θ_1$, the sensor array 14 always emits an electric signal $p_s$ formed on the basis of the operating pressure p. A "balancing" with the operating temperature θ or a taking into account of the operating temperature θ therefore does not take place.

Figure 8A:
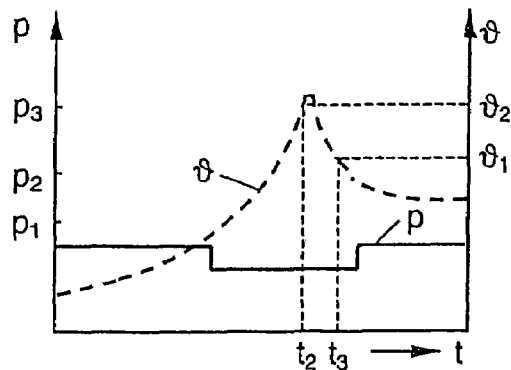

FIG. 8 shows a situation in which the operating pressure p of the refrigerant is in the normal range; that is, below the lower pressure limit value $p_1$. The refrigerant temperature θ rises significantly faster than illustrated in FIG. 7a and, at the point in time $t_2$, exceeds the upper temperature limit value $θ_2$. The temperature rise is so rapid that the time duration for the temperature rise from $θ_1$ to $θ_2$ is shorter than $t_{max}$. A "time-temperature-caused regulating intervention" therefore does not take place. Because the upper temperature limit value $θ_2$ is exceeded, a purely temperature-caused regulating intervention takes place at the point in time $t_2$.

Figure 8B:
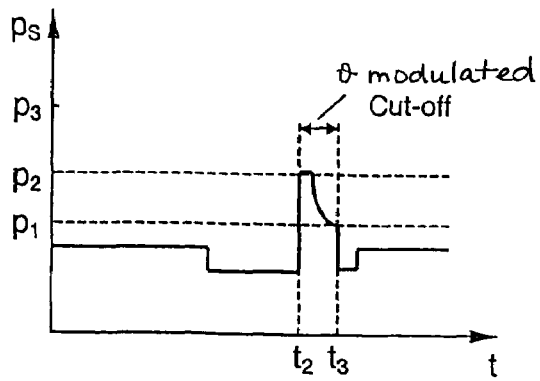

This is reflected by the sensor signal $p_s$ (FIG. 8b). Until the point in time $t_2$, the pressure signal is considered to be the relevant or critical signal. Because of the exceeding of the upper temperature limit value $θ_2$ at the point in time $t_2$, starting at the point in time $t_2$, the temperature signal is considered to be the relevant or critical signal. Correspondingly, starting at the point in time $t_2$, the electric signal $p_s$ supplied by the sensor array 14 to the electronic control unit 18 is formed on the basis of the refrigerant temperature θ. Since the refrigerant temperature θ exceeds the upper temperature limit value $θ_2$, the electronic control unit 18 regulates the refrigerant compressor 2 back or cuts it off completely. As an alternative or in addition, it may be provided that, if present, the electronic control unit 18 also correspondingly triggers an externally controllably expansion element 7 (FIGS. 2, 3). As a result of the regulating intervention of the electronic control unit 18, the refrigerant temperature θ drops and, at the point in time $t_3$, falls below the lower temperature limit value $θ_1$.

Starting at the point in time $t_3$, the refrigerant temperature is again in the normal temperature range. As a result, as illustrated in FIG. 8b, starting at the point in time $t_3$, the operating pressure is again considered to be the relevant or critical operating parameter and the electric signal $p_s$ supplied by the sensor array 14 is again formed on the basis of the operating pressure p starting at the point in time $t_3$.

Figure 9A:
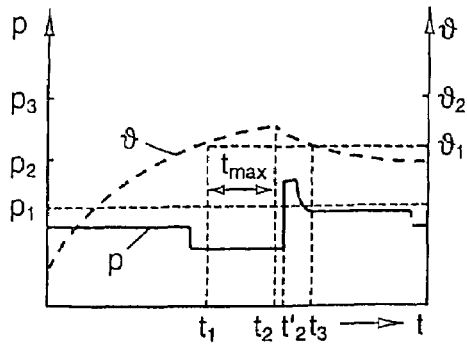
Figure 9B:
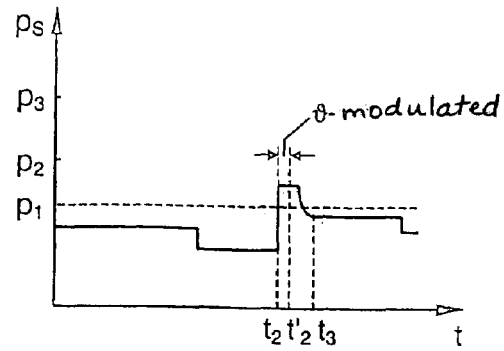

FIG. 9a shows a situation in which the operating pressure p of the refrigerant remains in the normal range, that is, below $P_1$, until the point in time $t'_2$. At the point in time $t_1$, the refrigerant temperature θ exceeds the lower temperature limit value $θ_1$ and continues to rise. As illustrated in FIG. 9b, until the point in time $t_2$, the operating pressure p is considered to be the relevant or critical signal. At the point in time $t_2$, the refrigerant temperature has exceeded the lower temperature limit value for a time period of $t_{max}$. As a result, starting from the point in time $t_2$, the refrigerant temperature is considered to be the relevant or critical signal, which is reflected in FIG. 9b by a sudden rise of the signal $p_s$. In the time period between $t_2$ and $t'_2$, the electric signal emitted by the sensor array 14 is therefore formed on the basis of the temperature signal. In this case, the signal course of the temperature signal does not necessarily have to be "simulated". As illustrated in FIG. 9b, it is sufficient for the electric signal $p_s$ to be above a defined critical value and is, for example, kept constant.

At the point in time $t'_2$, in addition, the operating pressure p of the refrigerant rises to a value which is between the lower pressure limit value $p_1$ and the upper pressure limit value $p_2$. This has the result that, starting at the point in time $t'_2$, the refrigerant pressure is considered to be the relevant or critical parameter and the electric signal $p_s$ simulates the measured refrigerant pressure p. Thus, during the time period between $t_2$ and $t'_2$, a "balancing" of the pressure signal first takes place with the temperature signal to form an equivalent pressure signal. Starting at the point in time $t'_2$, the electric signal $p_s$ "simulates" the pressure signal p without any balancing with the temperature signal.

Analogous to the above explanations, in a situation, as illustrated in FIG. 9a, a regulating intervention takes place starting at the point in time $t_2$; that is, a controlling-down of the refrigerant compressor 2 and/or a corresponding triggering of the expansion element 7.

Figure 10A:
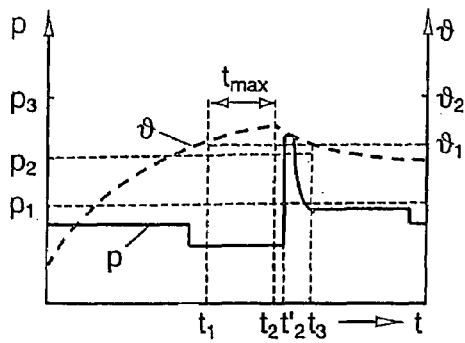
Figure 10B:
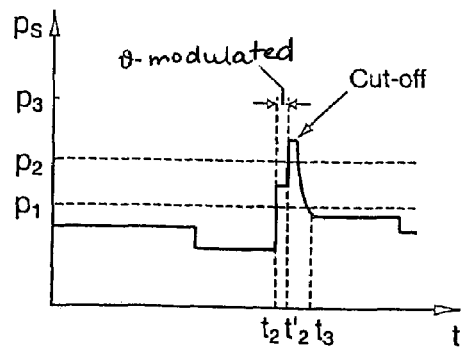

FIG. 10a shows a situation in which the refrigerant pressure remains in the normal range, that is, below the lower pressure limit value $p_1$, until the point in time $t'_2$. At first, the refrigerant temperature rises continuously and, at the point in time $t_1$, exceeds the lower temperature limit value $θ_1$. Subsequently, the temperature continues to rise. After a time period $t_{max}$, the refrigerant temperature is considered to be the critical or relevant signal. As illustrated in FIG. 10b, until the point in time $t_2$, the electric signal $p_s$ is formed on the basis of the measured operating pressure p. Starting from the point in time $t_2$, that is, after the expiration of the time period $t_{max}$, at first the refrigerant temperature is considered to be the critical or relevant signal, which is reflected by a corresponding rise of the signal $p_s$ to a value between $p_2$ and $p_1$.

As illustrated in FIG. 10a, at the point in time $t'_2$, the refrigerant pressure rises to a value above the upper pressure limit value $p_2$. Based on the exceeding of the upper pressure limit value $p_2$, starting at the point in time $t'_2$, the operating pressure is considered to be the relevant or critical signal, which is reflected in FIG. 10b by a further rise of the signal $p_s$. Starting at the point in time $t_2$, a first regulating intervention of the electronic control unit 18 already takes place, in which case it may be provided that, between $t_2$ and $t'_2$, first the capacity of the refrigerant compressor is lowered and, at the point in time $t'_2$, because of the exceeding of the upper pressure limit value $p_2$, the refrigerant compressor 2 is completely cut off. As illustrated in FIG. 10a, this then leads to a relatively fast lowering of the refrigerant pressure into the normal range. The refrigerant temperature θ also falls into the normal range below $θ_1$.

Figure 11A:
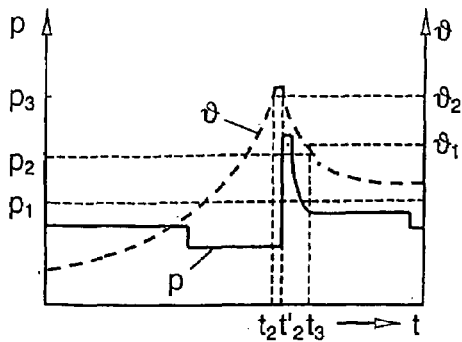
Figure 11B:
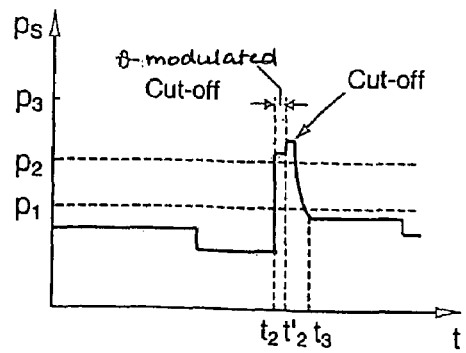

FIG. 11a shows a situation in which the operating pressure p remains in a normal range, that is, below the lower pressure limit value $p_1$, until the point in time $t'_2$. In contrast, the refrigerant temperature θ rises relatively rapidly and, at the point in time $t_2$, exceeds the upper temperature limit value $θ_2$. Until the point in time $t_2$, the refrigerant pressure p is considered to be the relevant or critical parameter. Since, at the point in time $t_2$, the refrigerant temperature θ exceeds the upper pressure limit value $θ_2$, the refrigerant temperature θ is considered to be the relevant or critical parameter starting at the point in time $t_2$. Therefore, as illustrated in FIG. 11b, starting at the point in time $t_2$, the electric signal $p_s$ supplied by the sensor array 14 to the electronic control unit 18 is formed on the basis of the refrigerant temperature θ. Thus, at the point in time $t_2$, a purely temperature-caused cut-off of the refrigerant compressor 2 or a purely temperature-caused regulating-down of the refrigerant compressor 2 takes place. At the point in time $t'_2$, a rise of the refrigerant pressure p takes place to a value above the upper pressure limit value $p_2$. Starting at the point in time $t'_2$ at which the refrigerant pressure exceeds the upper pressure limit value $p_2$, the refrigerant value is therefore again considered to be the relevant or critical signal. Thus, starting from the point in time $t'_2$, the electric signal $p_s$ supplied to the sensor array 14 again simulates to the refrigerant pressure p.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sensor array for a vehicle air conditioner, comprising:
    a housing;
    an electronic unit, a first sensor element connected with the electronic unit for measuring a first physical parameter, and a second sensor element connected with the electronic unit for measuring a second physical parameter, arranged in the housing;
    wherein the electronic unit has an electric signal output and an analyzing module which, as a function of momentary measuring values of the first and second physical parameters, according to a defined selection logic, determines which of the measured physical parameters is to be used as a momentarily relevant parameter, and which switches a sensor signal formed on the basis of the momentarily relevant parameter to the electric signal output.

2. The sensor array according to claim 1, wherein the first physical parameter is a pressure and the first sensor element is a pressure sensor, which is provided for measuring a refrigerant pressure of the vehicle air conditioner.

3. The sensor array according to claim 2, wherein the second physical parameter is a temperature and the second sensor element is a temperature sensor, which is provided for measuring a refrigerant temperature of the vehicle air conditioner.

4. The sensor array according to claim 3, wherein the two physical parameters are mutually independent.

5. The sensor array according to claim 3, wherein always one sensor signal formed on the basis of the first physical parameter is switched to the signal output when the measured second physical parameter is less than a defined lower limit value for the second physical parameter.

6. The sensor array according to claim 5, wherein a sensor signal formed on the basis of the second physical parameter is switched to the signal output when the first physical parameter is less than a defined lower limit value for the first physical parameter and when, for at least a defined time period, the second physical parameter is more than a defined lower limit value for the second physical parameter.

7. The sensor array according to claim 6, wherein a sensor signal formed on the basis of the second physical parameter is switched to the signal output when the first physical parameter is less than a defined lower limit value for the first physical parameter and when the second physical parameter is more than a defined upper limit value for the second physical parameter.

8. The sensor array according to claim 7, wherein a sensor signal formed on the basis of the first physical parameter is switched to the signal output when the first physical parameter is more than a defined lower limit value for the first physical parameter and when the second physical parameter is less than a defined upper limit value for the second physical parameter.

9. The sensor array according to claim 8, wherein a sensor signal formed on the basis of the second physical parameter is switched to the signal output when the second physical parameter is more than a defined upper limit value for the second physical parameter and when the first physical parameter is less than a defined upper limit value for the first physical parameter.

10. The sensor array according to claim 3, wherein a sensor signal formed on the basis of the second physical parameter is switched to the signal output when the first physical parameter is less than a defined lower limit value for the first physical parameter and when, for at least a defined time period, the second physical parameter is more than a defined lower limit value for the second physical parameter.

11. The sensor array according to claim 3, wherein a sensor signal formed on the basis of the second physical parameter is switched to the signal output when the first physical parameter is less than a defined lower limit value for the first physical parameter and when the second physical parameter is more than a defined upper limit value for the second physical parameter.

12. The sensor array according to claim 11, wherein the electronic control unit electrically controls an adjustable expansion element of the vehicle air conditioner.

13. The sensor array according to claim 3, wherein a sensor signal formed on the basis of the first physical parameter is switched to the signal output when the first physical parameter is more than a defined lower limit value for the first physical parameter and when the second physical parameter is less than a defined upper limit value for the second physical parameter.

14. The sensor array according to claim 3, wherein a sensor signal formed on the basis of the second physical parameter is switched to the signal output when the second physical parameter is more than a defined upper limit value for the second physical parameter and when the first physical parameter is less than a defined upper limit value for the first physical parameter.

15. The sensor array according to claim 1, wherein the second physical parameter is a temperature and the second sensor element is a temperature sensor, which is provided for measuring a refrigerant temperature of the vehicle air conditioner.

16. The sensor array according to claim 1, wherein the two physical parameters are mutually independent.

17. The sensor array according to claim 1, wherein always one sensor signal formed on the basis of the first physical parameter is switched to the signal output when the measured second physical parameter is less than a defined lower limit value for the second physical parameter.

18. The sensor array according to claim 1, wherein a sensor signal formed on the basis of the second physical parameter is switched to the signal output when the first physical parameter is less than a defined lower limit value for the first physical parameter and when, for at least a defined time period, the second physical parameter is more than a defined lower limit value for the second physical parameter.

19. The sensor array according to claim 1, wherein a sensor signal formed on the basis of the second physical parameter is switched to the signal output when the first physical parameter is less than a defined lower limit value for the first physical parameter and when the second physical parameter is more than a defined upper limit value for the second physical parameter.

20. The sensor array according to claim 1, wherein a sensor signal formed on the basis of the first physical parameter is switched to the signal output when the first physical parameter is more than a defined lower limit value for the first physical parameter and when the second physical parameter is less than a defined upper limit value for the second physical parameter.

21. The sensor array according to claim 1, wherein a sensor signal formed on the basis of the second physical parameter is switched to the signal output when the second physical parameter is more than a defined upper limit value for the second physical parameter and when the first physical parameter is less than a defined upper limit value for the first physical parameter.

22. The sensor array according to claim 1, wherein the housing of the sensor array is connected to a fluid pipe of the vehicle air conditioner and measures a pressure and a temperature of a refrigerant flowing in the fluid pipe.

23. The sensor array according to claim 22, wherein the refrigerant is carbon dioxide.

24. The sensor array according to claim 1, wherein the signal output of the sensor array is connected to a signal input of an electronic control unit arranged separately from the sensor array.

25. The sensor array according to claim 24, wherein the electronic control unit controls a compressor of the vehicle air conditioner.

26. The sensor array according to claim 25, wherein the electronic control unit electrically controls an adjustable expansion element of the vehicle air conditioner.

27. The sensor array according to claim 24, wherein the electronic control unit controls an evacuating element and opens the evacuating element so that the refrigerant can flow out into the environment when the first physical parameter and the sensor signal formed on the basis of the first physical parameter exceeds a defined critical value.

* * * * *